Figure 1:
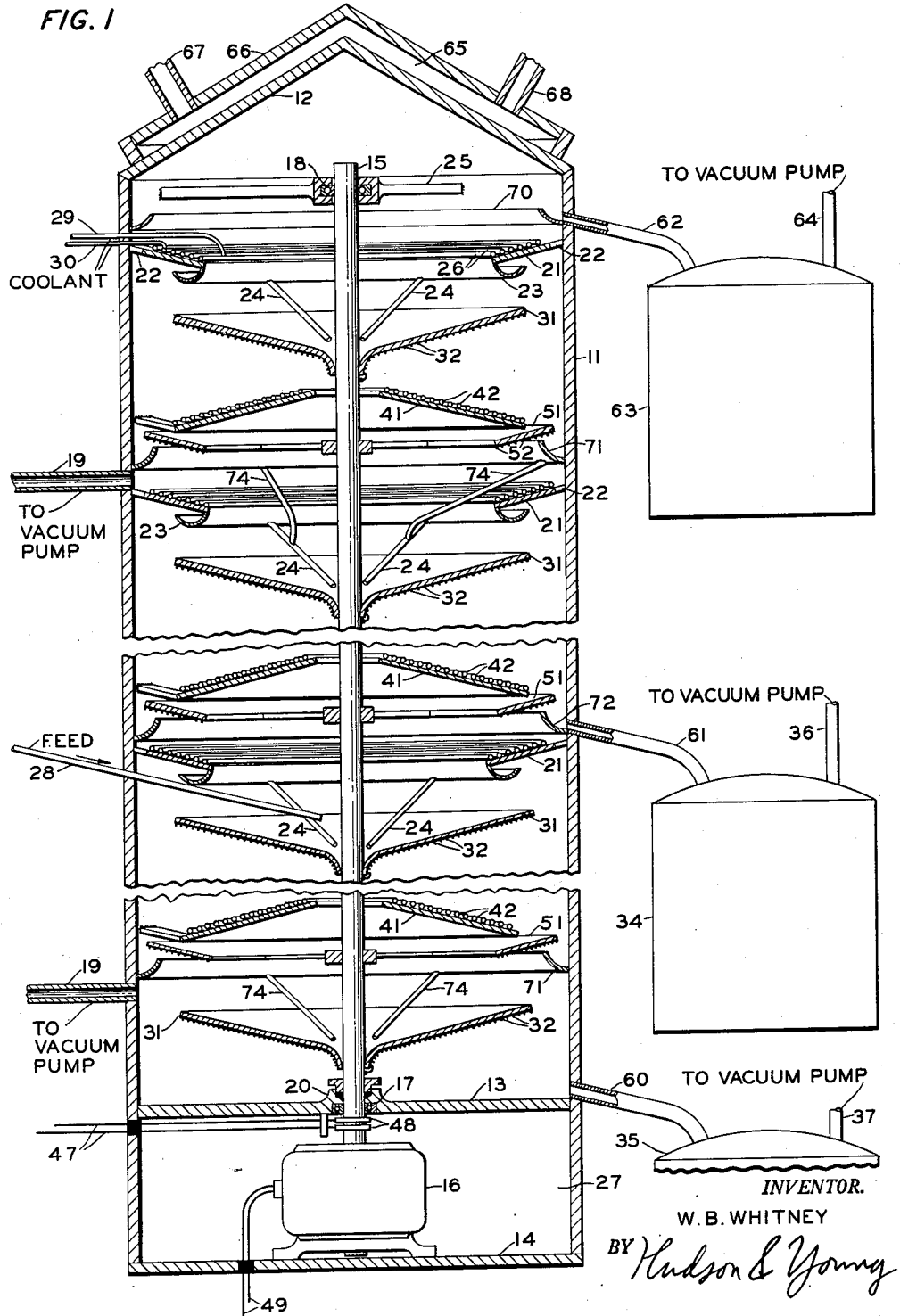

Feb. 12, 1952 W. B. WHITNEY 2,585,202
MOLECULAR STILL
Filed May 24, 1948 2 SHEETS—SHEET 1

INVENTOR.
W. B. WHITNEY
BY Hudson & Young
ATTORNEYS

Feb. 12, 1952 W. B. WHITNEY 2,585,202
MOLECULAR STILL

Filed May 24, 1948 2 SHEETS—SHEET 2

INVENTOR.
W. B. WHITNEY
BY Hudson & Young
ATTORNEYS

Patented Feb. 12, 1952

2,585,202

UNITED STATES PATENT OFFICE 2,585,202

MOLECULAR STILL

William B. Whitney, Bartlesville, Okla., assignor to Phillips Petroleum Company, a corporation of Delaware Application May 24, 1948, Serial No. 28,931

7 Claims. (Cl. 202—205)

This invention relates to distillation apparatus for use under high vacuum. In one of its more specific aspects it relates to a method for carrying out high vacuum distillation of difficultly distillable materials. In a still more specific aspect it relates to a method for distilling difficultly distillable materials under high vacuum and an apparatus in which to carry out the process.

Molecular or short-path distillation consists of heating a liquid, usually spread in a thin film or layer, which has in close proximity to the surface of said liquid a cooler condensing surface and keeping the intervening space evacuated to such a degree that the mean free path of the evaporating molecules is greater than the distance between the surface of the evaporating material and the condenser. The reduced pressure necessary to make the mean free path of sufficient magnitude to be useful in distillation is from $1 \times 10^{-3}$ to $1 \times 10^{-4}$ mm. of mercury.

While the requirements for molecular distillation are simple and simple equipment has been devised to carry out successfully molecular distillation, these prior art procedures are satisfactory only for extremely small-scale use. The problems of continually renewing the surface film, collecting successive fractions, controlling the temperatures of the evaporating and condensing sections, and maintaining a sufficiently reduced pressure all require quite complicated equipment when molecular distillation on a larger scale is attempted. One of the early forms of molecular distillation equipment was the simple pot still, which was followed by the falling-film still and later by the rotating-disk still. In the last still, the distilland is placed in the center of a rapidly revolving disk. The liquid is spread in a thin film as it moves to the edge of the heated disk, and, during the time of its passage over the disk, a portion is evaporated. This type of still has had extensive commercial use in the separation of fish oils into various fractions in certain of which are concentrated certain vitamin or provitamin-type compounds which were present in the original oil. This production of vitamin concentrates from materials which are non-distillable by means other than molecular distillation has been of extreme importance. The reason molecular distillation on a commercial scale up to the present has been limited substantially to the production of vitamin concentrates has been due to the high cost of the process making it available only for high-priced products. As valuable as this method has been, it still is tedius, for if several fractions are desired the material must be run through the stills several times, as only one vaporized and one residual product are obtained in each pass through the still. The fractionation efficiency is also very low, being of necessity no more than one theoretical plate and in practice often much less.

An object of my invention is to devise a process for carrying out a distillation operation under high vacuum. Another object of my invention is to provide an apparatus in which to carry out a distillation operation under high vacuum. Still another object of my invention is to provide an apparatus in which to carry out a distillation of difficultly distillable materials under high vacuum. Still another object of my invention is to provide an apparatus in which multi-stage fractionation under high vacuum may be carried out in one operation and in one apparatus. Other objects and advantages will be obvious to those skilled in the art upon reading the following disclosure, which taken with the accompanying drawing, forms a part of this specification.

Figure 2:
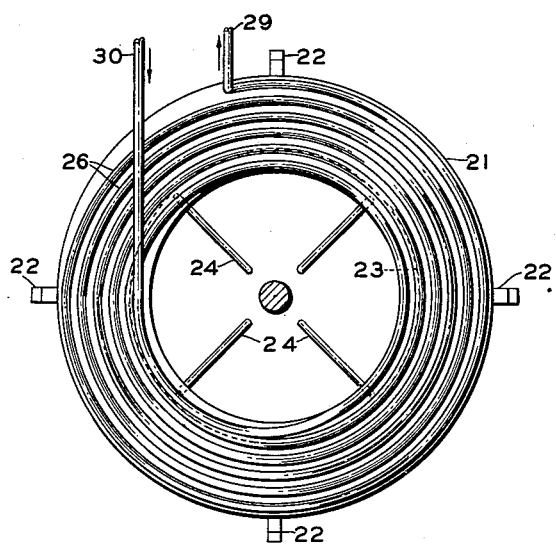
Figure 3:
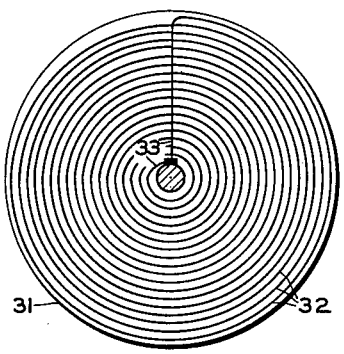
Figure 4:
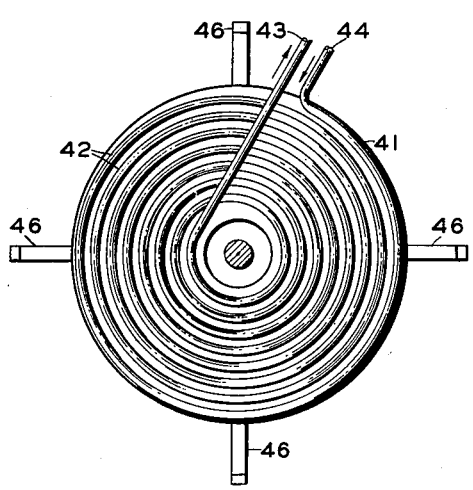
Figure 5:
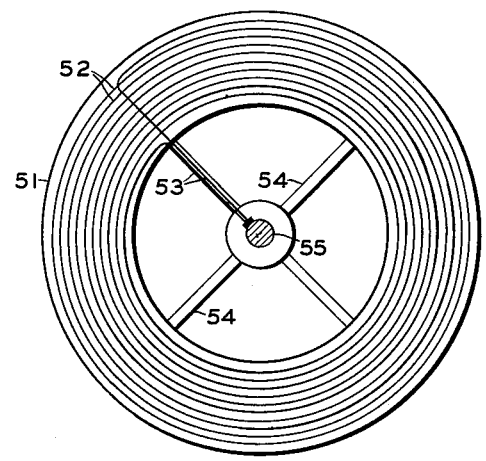

In the drawing, Figure 1 is a diagrammatic view, partly in section and partly in elevation, of one form of the apparatus of my invention. Figure 2 is a plan view of one piece (ring 21) of apparatus shown in Figure 1. Figure 3 is a plan view (looking upward) of another piece (disk 31) of apparatus shown in Figure 1. Figure 4 is a plan view of another component part (disk 41) of the apparatus shown in Figure 1. Figure 5 is a plan view (looking upward) of still another portion (ring 51) of the apparatus shown in Figure 1.

My invention comprises the improvement in molecular distillation obtained by arranging a series of evaporator-condenser pairs so that the residue from one evaporator and the condensate from the adjacent condenser are mixed and fed to the evaporator below by gravity and/or centrifugal force permitting repeated vaporization and condensation and resulting in a greatly improved degree of separation. In addition, said positioning permits a portion of the volatilized material to bypass the closest condenser and progress upwardly toward a more distant condenser above, thus moving to the upper portion of the distillation chamber in steps as repeated vaporization takes place, during which time the condensed vapors are repeatedly contacted with residual material progressively descending from evaporators and condensers overhead. This operation produces a process in which molecular distillation approximately approaches the process of rectification in a bubble tower for substances distilled under equilibrium distillation conditions. There are still great differences, however, as heat is added and abstracted throughout the series of evaporators and condensers in the chamber, and, while the condensate and residue from the "plates" above mix before being redistilled, they do not approach equilibrium, for, by definition of molecular distillation, vapor is almost non-existent in the system and what is present is not in equilibrium with the liquid. However, the liquid on each evaporator is substantially a close-cut fraction and the volatile product produced by each evaporator during a given distillation at a given operating temperature will have distinct characteristics.

Referring now to the drawing, a preferred form of the apparatus of my invention consists of a cylindrical shell 11 which has a base closure member 14 and an upper closure member 12. A vertically disposed shaft 15 is positioned axially in the chamber 11. An upper bearing 18 held in position by support arms 25 holds the upper end of the shaft 15 in position. A lower bearing 17 held in position by a plate 13 serves as another bearing for the shaft 15. The plate 13 may serve as a false bottom for the shell or cylinder 11, and in the embodiment herein shown the plate or bottom member 13 serves to retain liquid reaching the bottom of the shell 11. Surrounding and supporting the bearing 17 is a collar 20 which is rigidly connected to the plate 13. This collar extends vertically a sufficient distance as to extend above the maximum level of liquid retained by member 13 to prevent leakage downward. At the lower end of the shaft 15 and in a compartment represented by a cylindrical volume between plates 13 and 14, I have shown a source of motive power 16. This source of motive power need not be positioned in this space 27 but may be outside of the vessel 11 if desired. I have merely shown the source of motive power 16 as positioned in this compartment to eliminate a source of leakage when maintaining a high vacuum in the vessel 11.

Near the top end of the shaft 15 is mounted a disk shaped plate 31 which is rigidly attached to the shaft 15, as illustrated in Figure 1. This plate 31 I have shown as a wide-angle cone, and the particular angle of this conical member is not especially critical but may be between 160° and 170°. Immediately above this plate 31 is an annular member 21 which is rigidly attached to the cylindrical wall of the vessel 11 by means of some lugs 22. The lugs 22 extend beyond the outer periphery of the disk and when the disk is inserted in the vessel 11 to the proper position, the lugs 22 may be fastened to the walls of the chamber by welding or other means. The lugs also are intended to hold the outer edge of the disk 21 a small distance from the wall of the chamber 11 so that any liquid accumulating on the inner wall of the vessel above the disk 21 may flow freely downward.

Below the disk 31 is a second disk 41. This disk is, like member 31, a wide-angled conical member, but it is inverted relative to the positioning of disk 31. Disk 41 is attached to the walls of the chamber 11 by members 46 (see Figure 4). The outer ends of these support members 46 may be welded or otherwise attached to the inner wall of the chamber 11 for rigid positioning. Since the disk 41 is intended not to rotate, a hole is provided in the center of the disk some larger in diameter than the diameter of the shaft 15 and through which this shaft extends. Below this disk 41 is an annular member 51. This annular member may best be seen on reference to Figure 5 which shows a plan view. Some spoke members 54 attached to the ring 51 at their outer ends converge to a common point to form a hub. In the center of this hub is an opening 55 for accommodation of shaft 15. The hub may be keyed to the shaft or fastened by set screws or other means such that the disk 51 is rigidly fixed to the shaft. This disk is intended to rotate as the shaft 15 rotates, and similarly disk 31 is also intended to rotate as the shaft rotates. The annular ring 21 and the disk 41 are intended not to rotate as the shaft 15 rotates.

Immediately below the annular ring 51 is a drain 71, which is attached to the wall of the vessel 11. This drain is intended to serve as a trap or retaining means for liquid flowing down the walls of the vessel. At the lower edge or around the small diameter of the annular ring 21 is a drain 23, which is intended to catch liquid which condenses on the lower surface of the ring. Liquid condensing on the lower surface of the ring 21 flows by gravity due to the conical nature of this annular member and accumulates in this drain 23. Several spouts 24 are connected to this drain 23 so as to conduct liquid from the drain 23 onto the top of the disk 31 at a point near the shaft 15.

A ring member 51 with the next higher ring member 21 comprise apparatus for substantially one stage of distillation while a disk 31 with the next higher disk 41 comprise another stage of distillation. Additional sets of rings and disks provide as many stages of distillation as desired. Drains 74 are provided to conduct liquid material from each drain 71 to the next lower disk 31. These drains 74 may be long straight tubes and so disposed as to conduct liquid from the drains 71 to a point near the center of the next lower disk or the drains 74 may be relatively short and curved in such a manner as to transfer liquid from the drains 71 through drains 74 into drains 24 and the latter transfers liquids from the drains 71 and 23 to the center of the next lower disk 31. These drains, such as 24 and 74, may be tubes of circular cross sections or they may be of a U-shaped cross section.

The disks 31 and the annular rings 51 are, in effect, evaporator plates, while annular rings 21 and disks 41 are, in effect, condenser plates. Means 32 are supplied for providing heat to disks 31 and means 52 are supplied for providing heat to the annular rings 51. Electrical means is very convenient for supplying heat to these several members and accordingly means 32 and means 52 may be electrical heater wires. For electrical heat, I have shown wires 47 as conducting electrical current from a source, not shown, to my apparatus for providing heat for this distillation operation. The lead wires 47 are passed through the walls of the vessel 11 and electricity from these wires may be transferred to the wires, not shown, imbedded in the shaft 15. Some ring and brush assemblies 48 are provided for transferring electrical power from wires 47 to the wires contained in the shaft 15. The heating elements 32 may be connected directly to the wires in the shaft 15. The heating elements 52 on the rings 51 are also connected through the shaft 15 to the electrical wires contained therein. The condenser rings 21 have mounted on the upper sides some tubes 26 through which cooling fluid may circulate. The condenser disks 41 also have some tubes 42 mounted on their upper side through which cooling fluid may circulate. The tubes 26 and 42 are connected through the walls 11 of the chamber to a source of cooling fluid not shown. A pipe 28 is provided at a desired point for introduction of feed stock to be fractionated into the vessel 11. Tubes 19 lead from the vessel 11 to a vacuum pump system not shown. A tube 50 connected to the lower portion of the vessel 11 is intended for use in withdrawal of bottoms product from the distillation operation to a run storage tank 35. Tube 61 is provided for withdrawal of material from the drain 72, and material withdrawn from drain 72 may be termed a side-stream or intermediate product and may be passed from drain 72 through tube 61 to a storage vessel 34. A tube 62 is intended to convey material from the drain 70 at the upper portion of the vessel into an accumulator tank 63, and material withdrawn from this drain 70 may be termed overhead product. This vessel 63 has provided a connection 64 which in turn is connected to a source of vacuum, not shown. In a similar manner the receiving or accumulating vessels 34 and 35 may be provided with tubes 36 and 37, respectively, for connections to the source of vacuum, not shown. Vessels 63, 34, and 35 are preferably provided with cooling means, not shown, to prevent loss of the collected products by evaporation. They are also preferably provided with the product draw-off connections, not shown.

The top 12 of the vessel 11 is operated as a condenser. A plate 66 is positioned at the top of the vessel as shown to form a space 65 through which cooling fluid may circulate. Connection 67 may serve as an inlet and connection 68 as an outlet for the flow of this cooling fluid.

In Figure 5, which is a bottom view of an evaporator 51, are shown the heating wires 52 and lead wires 53 for connecting the heating wires 52 with wires in shaft 15. In Figure 3, which is a bottom view of an evaporator disk 31, are shown the heater wires 32 and the lead wires 33 for connecting the heater wires with the main wires in the shaft 15. In Figure 4 are shown the cooling coils positioned on the top side of a condenser 41 and the connecting tubes 43 and 44 are intended to conduct cooling fluid to and from a source of cooling fluid, not shown. In Figure 2 are also shown cooling coils 26 on the top of an annular ring 21 and tubes 29 and 30 for flow of cooling fluid to and from its source.

In the operation of the process of my invention the apparatus as herein described is evacuated and means 16 set into operation for rotating the shaft 15. Electrical heaters 52 and 32 on the evaporator rings and disks are put into operation and coolant is circulated through the tubes 26 and 42 on the condenser plates. Liquid material to be fractionated into, for example, an overhead product, one intermediate product and a bottoms product, is introduced through inlet tube 28 into the fractionator. The feed material then reaches a center point on the feed evaporator disk 31. Material which does not evaporate from the disk 31 travels outward by centrifugal force and finally is thrown from the periphery to the walls 11. Material which is evaporated from this spinning feed evaporator disk passes directly vertically to the underside of the next higher condenser disk 41. Material condenses on the underside of this disk, and as condensate accumulates thereon, droplets form, and as droplets become larger, they tend to flow by gravity to the periphery of the condenser 41 and from the periphery they drop on to the adjacent evaporator plate 51. Since this evaporator plate is hot and is rotating, the condensate from the condenser disk 41 will be spread out on the evaporator plate 51 in a thin film, and, under such conditions, molecules which are evaporated will travel vertically upward from this plate 51 and impinge against the underside of the next higher condenser ring 21. As material condenses on the underside of this condenser ring 21, droplets begin to form, and condensate will tend to flow by gravity and will accumulate in the drain or gutter 23. This condensate then flows from this drain 23 through the tubes 24 to a center point of the adjacent evaporator disk 31. This evaporator disk is just exactly like the evaporator disk on which the feed stock to the fractionator was introduced, but of course, it is the next higher evaporator disk in the column. The aforementioned evaporation and condensation is repeated. Evaporated material from the last said evaporator 31 passes upward and is condensed on the underside of the next higher condenser disk 41. Liquid drops from the outer periphery of this disk onto the adjacent evaporator ring 51. As mentioned hereinbefore, this evaporator ring is rotating, and the liquid thereon is spread out in a thin film. Material evaporating from this film travels directly upward and is condensed on the underside of the next higher condensing ring 21. Condensate from this point is conducted by means of the trough 23 through tubes 24 onto the adjacent rotating evaporator disk 31. Material being evaporated from this upper disk travels vertically, is condensed on the condensing surface 12. From this surface, condensate flows downward and is trapped by the drain 70. This drain is so positioned that the liquid accumulating therein flows by gravity toward the outlet tube 62, through which this material passes to the accumulator 63.

Since the evaporator disks 31 rotate, material which does not evaporate from any of these disks is thrown from the sides of the disks to the walls 11 of the fractionator. This liquid drains down the walls and is retained by a drain 71 and is transferred therefrom through tubes 74 to the next lower evaporator disk 31. Material retained by drain 72 passes out tube 61 into vessel 34 as an intermediate product. Material, upon being dropped upon the center of an evaporating disk, is also spread out in a thin film over the surface, and some of this material may evaporate and pass upward toward the next higher condensing disk. Material not evaporated will be thrown from the disk to the outer wall 11. This liquid will drain into one of the side wall drains 71 or 72. Material thrown outward by the bottom evaporator plate may be withdrawn through the tube 60 as bottoms product. From the description above given it will be seen that each condenser-evaporator pair amounts to a stage of fractionation and means have been provided for vapors to travel upward through this vessel and for liquid to travel downward through this vessel. In one preferred mode of operation, the temperature of successive evaporating members 31 and 51, will decrease somewhat from the bottom to the top of the still. A similar decrease may be maintained for the condensing members 41 and 21.

It will be obvious that many variations and alterations in the apparatus and process herein described can be made with the skill of the art, such as, providing a smaller or larger number of evaporator-condenser plates, providing for more side products, providing other means for rotating shaft 15 and the attached disks and rings, other means for heating the rotating disks and rings, other means for cooling the condenser rings and disks, etc. Also, the feed may be introduced onto any of the evaporating disks or onto two or more simultaneously, as desired.

Materials of construction may be selected from among those commercially available. Special materials are not needed excepting as required due to corrosiveness of materials being treated. Equipment of course is designed and constructed to withstand high vacuum.

Having disclosed my invention, I claim:

1. An apparatus for use in distillation of material under high vacuum comprising a vertically disposed cylindrical shell, a rotatable disk evaporator disposed to rotate around the axis of said cylindrical shell as a center, a nonrotatable condenser disk disposed concentrically with respect to said axis and to said evaporator disk and disposed above said evaporator disk, a rotatable evaporator ring disposed to rotate around the axis of said cylindrical shell as a center and disposed between said evaporator and condenser disks, a nonrotatable condenser ring disposed concentrically with respect to said axis and above said nonrotatable condenser disk, a second rotatable evaporator disk disposed below said nonrotatable condenser ring and concentrically with respect to said axis and above said nonrotatable condenser disk, a second nonrotatable condenser disk disposed above said condenser ring, means attached to and rotatable therewith for heating and means for rotating said evaporator disks and rings, means for cooling said condenser disks and rings, means for collecting and removing distilled liquid from said second nonrotatable condenser disk, means for collecting and removing undistilled liquid from said first rotatable disk evaporator, means for collecting undistilled liquid from said evaporator ring and from the second rotatable evaporator disk, and conduit means communicating from last said collecting means to a point above and near the center of the first mentioned rotatable evaporator disk, means for collecting condensate from said non-rotatable condenser ring and conduit means for transferring condensate from the last mentioned condensate collecting means to a point above and near the center of said second rotatable evaporator disk and means for introducing liquid to be distilled to the top at a point near the center of said first evaporator disk.

2. The apparatus of claim 1 wherein the inner diameter of the annular condenser ring is approximately equal to the diameter of the disk evaporator.

3. The apparatus of claim 1 wherein the respective inner diameters and the respective outer diameters of the condenser ring and of the evaporator ring are equal.

4. The apparatus of claim 1 wherein the inner diameters of the condenser ring and of the evaporator ring, the diameter of the disk evaporators and the outer diameter of the first mentioned disk condenser define substantially a cylinder.

5. The apparatus of claim 1 wherein the circular evaporator disks and the disk condensers are wide-angle conical members the first evaporator and first condenser disks having their open ends directed toward each other and the second evaporator and second condenser disks also having their open ends directed toward each other.

6. An apparatus for use in the separation of material under high vacuum comprising a vertically disposed cylindrical shell having both ends closed, a rotatable shaft along the axis of said cylindrical shell, a circular disk evaporator rigidly fixed to said shaft and adapted to rotate as the shaft rotates, a circular disk condenser surrounding and sloping downward and away from said shaft and disposed directly above said evaporator disk and rigidly attached to the side wall of said shell and adapted to permit free rotation of said shaft, an annular evaporator ring disposed concentrically around said shaft and rigidly attached thereto and adapted to rotate therewith, said annular evaporator disposed intermediate said evaporator disk and said condenser disk with respect to the axis of said shell but closer to the condenser disk than to the evaporator disk and the short diameter of said annular evaporator overlapping the diameter of said disk condenser so that condensate dropping from the periphery of the disk condenser may drop upon the annular evaporator, an annular condenser ring sloping downward in the direction of the axis of said cylindrical shell and disposed directly above said annular evaporator and above said circular disk condenser, said annular condenser and said annular evaporator having their corresponding diameters equal, a second circular disk evaporator rigidly fixed to said shaft at a point intermediate said circular condenser disk and said annular condenser ring and adapted to rotate with said shaft, drain means for conducting condensate from the underside of said annular condenser ring to a point near the center of said second circular disk evaporator, and a circular condenser in the top of said shell and above said disks and rings, conduit means to conduct condensate from said latter circular condenser out of said shell, conduit means extending through the sidewall of said shell for introducing feed material to be separated upon the first mentioned circular evaporator disk, and conduit means in the bottom of said shell for removing bottom product, electric motor means within said shell for rotating said shaft and attached disks and annular ring, means for heating the evaporators positioned successively higher in said shell to successively lower temperatures, means for cooling the condensers positioned successively higher in said shell to successively lower temperatures, the outer diameters of the annular evaporator ring and of the annular condenser ring are greater than the diameters of the circular disk evaporators and of the first mentioned circular disk condenser and the diameters of the circular disk evaporators and of the first mentioned circular disk condenser overlap the inner diameters of said annular evaporator ring and of said annular condenser ring.

7. The apparatus of claim 6 wherein said circular evaporator disks are wide angle conical members with their apexes pointing downward, the circular condenser disk is a wide angle conical member with its apex pointing upward, the annular evaporator and the annular condenser members having substantially frusto-conical surfaces of wide angle cones.

WILLIAM B. WHITNEY.

REFERENCES CITED

The following references are of record in the file of this patent:

UNITED STATES PATENTS

| Number | Name | Date |
|---|---|---|
| 2,218,240 | Hickman | Oct. 15, 1940 |
| 2,209,377 | Hickman | Oct. 13, 1942 |
| 2,313,175 | Scott et al. | Mar. 9, 1943 |
| 2,370,464 | Hickman | Feb. 27, 1945 |